(12) United States Patent
Oblack

(10) Patent No.: US 6,565,404 B2
(45) Date of Patent: May 20, 2003

(54) FLYING PET TOY

(76) Inventor: Mark Oblack, 900 SW. Cedarglade, Issaquah, WA (US) 98027

(*) Notice: Subject to any disclaimer, the term of this patent is extended or adjusted under 35 U.S.C. 154(b) by 0 days.

(21) Appl. No.: 10/243,068

(22) Filed: Sep. 12, 2002

(65) Prior Publication Data

US 2003/0068954 A1 Apr. 10, 2003

Related U.S. Application Data

(60) Provisional application No. 60/329,472, filed on Oct. 10, 2001.

(51) Int. Cl.$^7$ ............................................... A63H 27/00
(52) U.S. Cl. ......................................................... 446/46
(58) Field of Search ............................. 446/46, 47, 48, 446/61, 62, 63, 64, 65, 66, 67, 68; 473/590, 588, 589

(56) References Cited

U.S. PATENT DOCUMENTS

| | | |
|---|---|---|
| 3,565,434 A | 2/1971 | Liston |
| D243,029 S | 1/1977 | Crew |
| 4,104,822 A | 8/1978 | Rodgers |
| 4,115,946 A | 9/1978 | Vukmirovich |
| 4,174,834 A | 11/1979 | Martino |
| 4,203,249 A | 5/1980 | Bohm |
| 4,222,573 A | 9/1980 | Adler |
| 4,223,473 A | 9/1980 | Brown |
| 4,241,533 A | 12/1980 | Newsome |
| 4,288,942 A | 9/1981 | Nicholl |
| 4,290,226 A | 9/1981 | Stauffer |
| 4,307,535 A | 12/1981 | Martin |
| 4,370,824 A | 2/1983 | Resnicow |
| 4,425,734 A | 1/1984 | Bauer |
| 4,669,996 A | 6/1987 | Bershak |
| 4,820,230 A | 4/1989 | Richards |
| 4,854,907 A | 8/1989 | Holmes |
| 4,915,661 A | 4/1990 | Getgey |
| 4,944,707 A | 7/1990 | Silverglate |
| 4,973,284 A | 11/1990 | Sassak |
| 5,020,808 A | 6/1991 | Richards |
| D322,642 S | 12/1991 | Crew |
| 5,078,637 A | 1/1992 | McFarland |
| 5,080,624 A | 1/1992 | Brinker |
| 5,116,275 A | 5/1992 | Sassak |
| 5,261,846 A | 11/1993 | Hanna |
| 5,326,299 A * | 7/1994 | Jasinski ....................... 446/46 |
| 5,340,347 A | 8/1994 | Yenerich |
| 5,358,440 A | 10/1994 | Zheng |
| 5,362,067 A | 11/1994 | Nelson |
| 5,655,777 A | 8/1997 | Neading |

(List continued on next page.)

Primary Examiner—Jacob K. Ackun
Assistant Examiner—Faye Francis
(74) Attorney, Agent, or Firm—Kathleen T. Petrich

(57) ABSTRACT

A flying toy having a resilient, non-circular frame substantially radiated about an imaginary center axis. The fame includes a plurality of elongated side members substantially interconnected by a plurality of radially-extending feet members, where a higher concentration of the weight of the frame resides at its periphery. Each side member is arced inward toward the imaginary center axis. The frame defines a central opening of which the imaginary axis is axially aligned. A flexible membrane is attached to least a portion of the side members and substantially covers the central opening.

In one embodiment, a center portion of each side member is positioned above its adjacent feet members when the toy is in an at rest position to form a structure that is substantially concave in shape in the at rest state. During spinning flight, the higher concentration of weight at the periphery induces centrifugal force upon the toy causing the side members to partially flatten out. When the toy lands, it lands upright and reverts to its at rest position.

18 Claims, 12 Drawing Sheets

U.S. PATENT DOCUMENTS

| | | |
|---|---|---|
| 5,800,237 A | 9/1998 | Cummings |
| 5,816,879 A | 10/1998 | Kyame |
| 5,853,311 A | 12/1998 | Bartholowmew |
| 5,873,761 A | 2/1999 | Johnson |
| 5,901,926 A | 5/1999 | Zheng |
| 6,050,871 A | 4/2000 | Chen |
| 6,113,453 A * | 9/2000 | Stuffelbeam ................ 446/46 |
| 6,174,214 B1 | 1/2001 | Cooper |
| 6,293,879 B2 | 9/2001 | Moore |
| 6,390,879 B1 * | 5/2002 | Spector ..................... 446/46 |
| 6,443,862 B1 | 9/2002 | Darnell |

* cited by examiner

FLYING PET TOY

RELATED APPLICATION

The present application claims priority to U.S. Provisional Application Ser. No. 60/329,472, filed Oct. 10, 2001, and entitled "Flying Pet Toy."

TECHNICAL FIELD

The present invention relates generally to toys capable of flight while spinning about an axis.

BACKGROUND OF THE INVENTION

Flying toys have been known for quite some time. The hard, plastic flying disc has had great commercial success, both for use with people and with dogs. However, some dogs are less enamored with the hard plastic discs as they are not designed to be picked up easily off the ground. Others have attempted flying discs; some have invented fabric discs that land upright, but the discs are not readily grippable by either a person's hand or a pet's teeth when disc has landed. Moreover, many of the discs do not exhibit superior flying and spinning characteristics, which makes such discs less interesting to users, whether humans or pets.

SUMMARY OF THE INVENTION

The present invention relates to a flying toy that is capable of flight when propelled with a spinning force. The apparatus includes a substantially resilient, non-circular frame that is substantially radially generated about an imaginary axis such that a higher concentration of the frame's weight is at the frame's periphery. The frame includes a plurality of side members with radially-extending feet members positioned between adjacent side members. The frame defines a central opening of which the imaginary axis is axially aligned. A lightweight, flexible membrane substantially covers the central opening and is attached to at least a portion of each side member.

In a first embodiment, the side members are arched upwardly of the adjacent feet members and inwardly toward the imaginary center axis when the toy is in an at rest position. With the membrane, the overall resulting structure is substantially concave in shape when viewed from the side in the at rest position.

In a second embodiment, the side members are substantially coplanar with the membrane in the at rest position.

The invention also includes a method of use whereby when the toy of the first embodiment is launched into flight, the inherent higher concentration of the toy's weight at the periphery induces centrifugal force upon the toy thereby causing the side members to partially flatten out. The opposing forces of centrifugal force and resilience in the side members put the toy under tension during flight, which affects the airfoil characteristics of the toy. When the toy is traveling at a higher velocity, the reduced airfoil is desirable. As the toy gradually slows down, the resilience of the side members gradually overcomes the centrifugal force and the overall substantially concave shape is gradually resumed, which creates a thicker airfoil and increased lift while the toy descends to ground.

The toy of the second embodiment also has a higher concentration of the toy's weight at the periphery, but will move in a boomerang-like path when the toy is propelled with a spinning force.

These and other features and benefits will be discussed in further detail in the various figures of the attached drawing, the Brief Description of the Drawing, and the Best Mode for Carrying Out the Invention.

BRIEF DESCRIPTION OF THE DRAWINGS

Like reference numerals are used to designate like parts through the several views of the drawings, wherein.

BEST MODE FOR CARRYING OUT THE INVENTION

Figure 5:
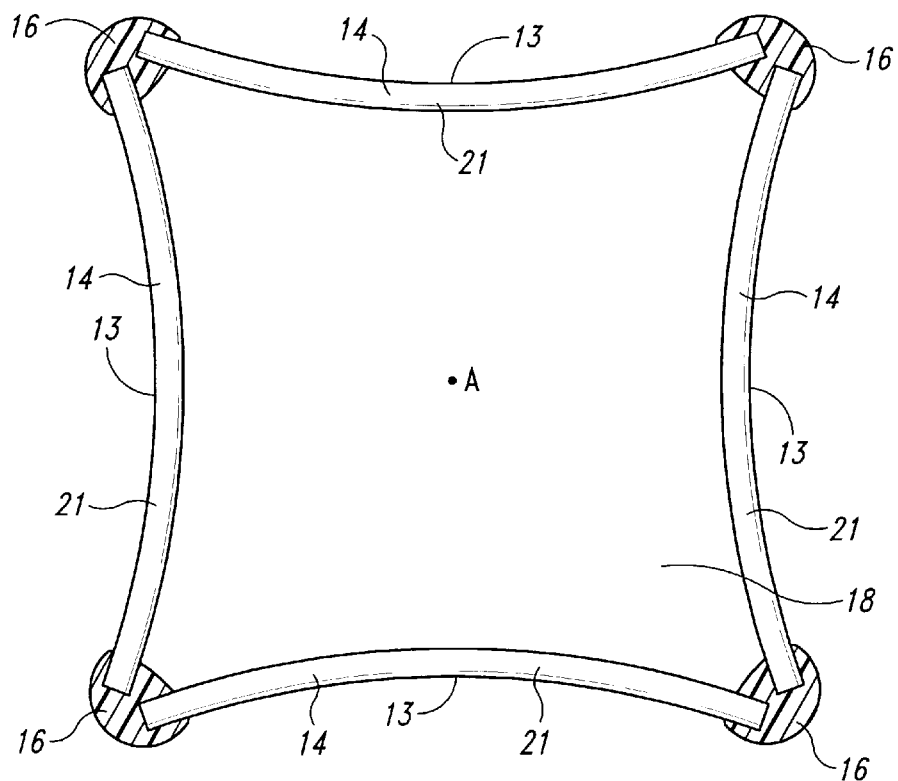
FIG. 5 is a top plan view like that of FIG. 2 but only illustrating the frame and central opening and feet shown in cross section.
Figure 6:
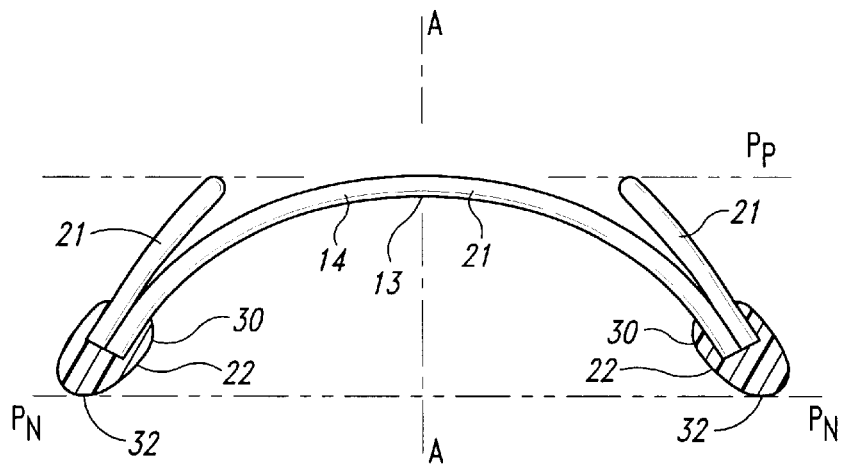
FIG. 6 is a cross section view of the toy taken substantially along lines 6—6 of FIG. 1, less the membrane, and better showing the feet members.

A flying pet toy 10 that is capable of flight when propelled with a spinning force as illustrated in FIGS. 1–4. Referring also to FIGS. 5 and 6, the toy 10 includes a resilient, non circular, frame 12 that is substantially generated about Axis A—A. The frame 12 is comprised of a plurality of resilient side members 14 positioned between radially-extending feet members 16. In a first embodiment, each side member is positioned such that a central portion 13 of each side member is raised above its adjacent feet members 16 when the toy 10 is in a quiescent or "at rest" state. As best illustrated in FIGS. 5, the frame forms a periphery in which a central opening 18 is defined. Axis A—A is axially-aligned within central opening 18.

Each foot member 16 has a bottom portion 20 that is the nadir of the toy in the at rest state. These bottom portions of each foot member substantially reside in a nadir plane $P_n$ when the toy 10 is in the at rest position, as shown in FIGS. 1–4. It should be understood that given the imprecise manufacturing techniques and use, of which are further discussed, below, the feet members at any given time may be not equally coplanar. Thus, the nadir plane is a general guideline (substantially coplanar) as opposed to an absolute value.

Each side member 14 is positioned in such a way relative to the adjoining feet members as to define an essentially overall concave-shaped frame as best illustrated in FIG. 6. According to one embodiment of the invention, each side member 14 is arched upwardly relative to the adjoining feet members and inwardly toward Axis A—A. The overall concave-shape of the side members can be accomplished, in one embodiment, through flexible, resilient tube members 21 that have preset arches and that such arched tube members 21 are attached at the feet members 16. Another embodiment would be to use a continuous formed member that defines the shape of the frame.

Figure 7:
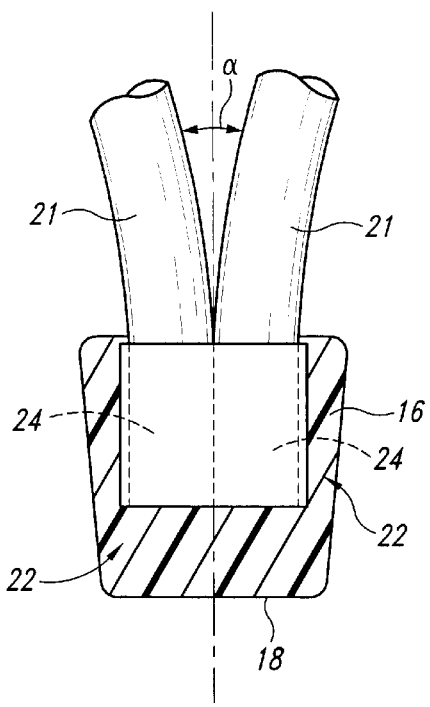
FIG. 7 is an enlarged perspective view of a portion of the frame connected to a foot member.
Figure 8:
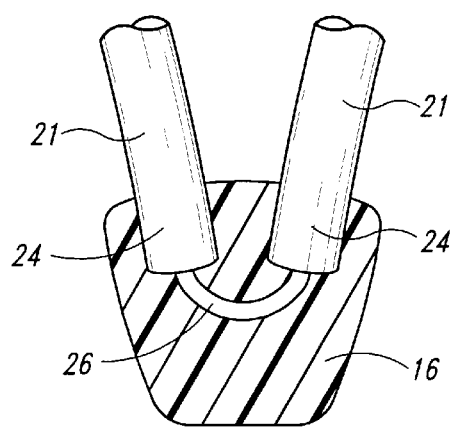
FIG. 8 is a perspective view of an alternate embodiment of ends of side members connected to a foot member.
Figure 9:
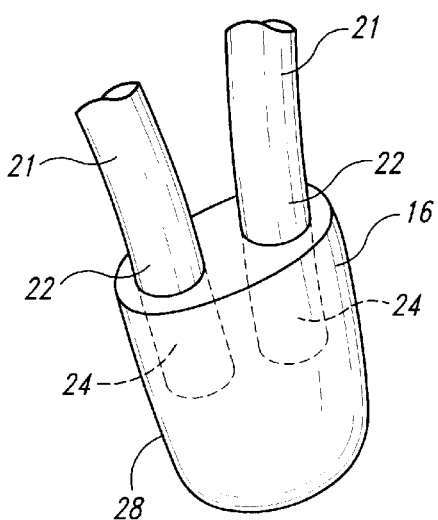
FIG. 9 is a perspective view of another alternate embodiment of a frame portion connected to a foot member.

As discussed above, the side members may be made from flexible, resilient, tube members 21. The term "tube member" does not necessarily require a cylindrical-shaped member having a circular cross section, although that is the preferred embodiment illustrated in FIGS. 5–6 and as illustrated in FIGS. 7–9. For the purposes of the present invention, tube member 21 can have any polygonal, amorphous, arcuate, or airfoil cross section, such as oblong, square, rectangular, triangular, etc. Alternatively, the side members may be made from flexible rod, foam, rope, rubber, thermoplastics urethanes, or any material that will provide sufficient resilience to support the raised sides while allowing centrifugal force to partially flatten the device while in flight.

Referring again to FIG. 2, the weight of the toy is concentrated at the periphery. A substantial portion of the overall weight of the toy resides between the concentric circles $C_1$ and $C_2$, which is generally 50% or more of the overall toy. A higher concentration of weight of the frame inherently resides at the periphery between $C_1$ and $C_2$ at the feet members 16 and a portion of the adjacent side members 14 that radially extend outwardly from Axis A—A.

In a preferred form, each foot member may include an additional weighted pad 22, which may be a synthetic rubber pad. Alternatively, the weighted pad 22, may be made from natural rubber or any other tough and abrasion-resistant material. The additional weight adds gyroscopic stability (e.g. making the toy fly in a substantially straight path) and aids the toy to land upright, i.e. on its feet after flight, which is desirable. Additionally, the rubber pad added to each foot member minimizes abrasion damage to the toy when landing on a hard surface, such as a pavement.

Referring to FIGS. 7–9, adjacent side members 14 can be joined to its corresponding adjoining foot member 16 by a variety of means. By way of illustration, one way to accomplish this is shown in FIG. 7 where ends 24 of side member 14 terminate within the adjoining foot member. Alternatively, ends 24 of adjacent side members may be adhered or sewn atop of the foot member, or sewn and secured between the foot member and an outside layer of fabric or other membrane material (discussed further below). Ends 24 from adjacent side members 14 may be positioned together, as illustrated in FIG. 7, or apart as illustrated in FIG. 9. In yet another means, two adjacent ends 24 may be connected by another tubular rod 26, as illustrated in FIG. 8. However, the pad of the previous paragraph is not a requirement for the invention to function properly. Rather, the feet members 16 may consist of the joined ends of the side members or of the peripheral ends of the frame that may be one unitary structure as already mentioned above.

Figure 1:
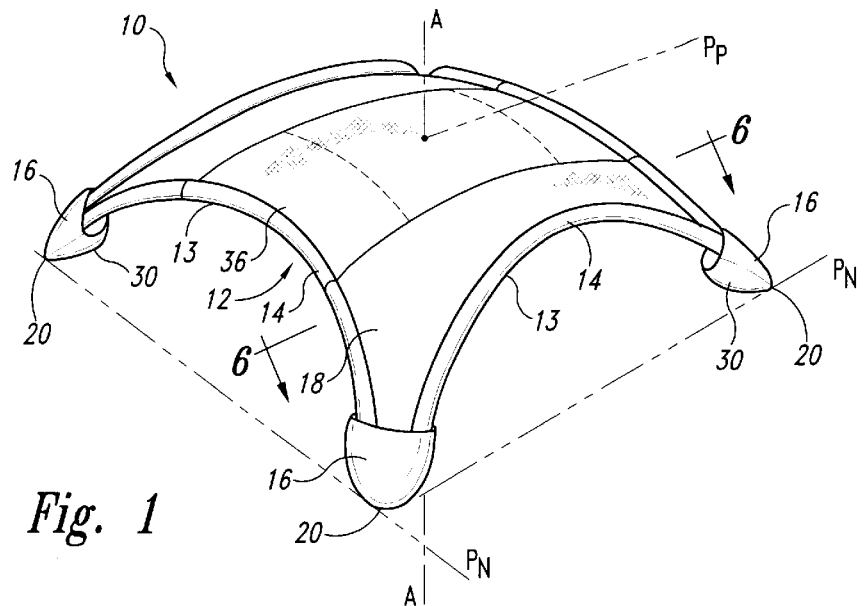
FIG. 1 is a perspective view of a first embodiment of a flying toy of the present invention shown in an "at rest" state.
Figure 2:
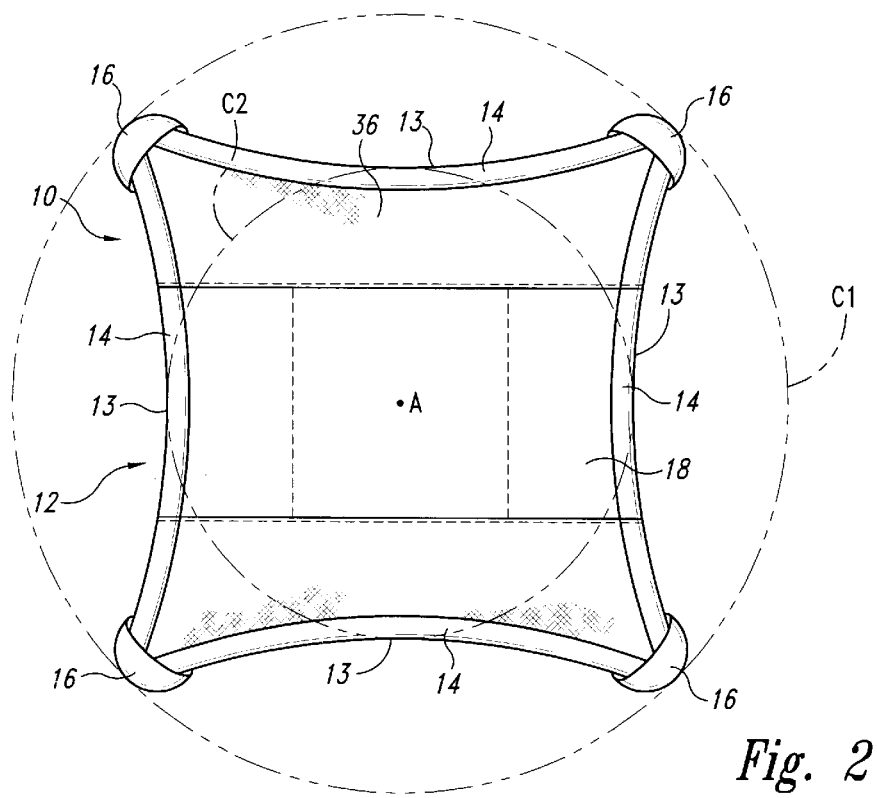
FIG. 2 is a top plan view of the toy of FIG. 1.
Figure 3:
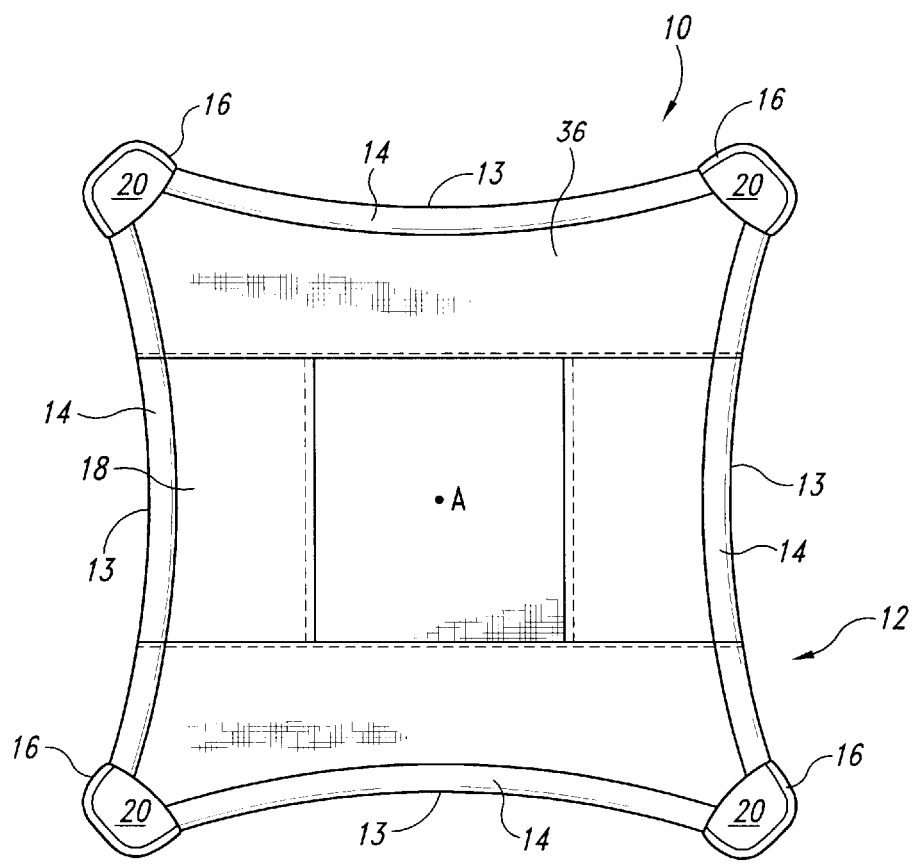
FIG. 3 is a bottom plan view thereof.
Figure 4:
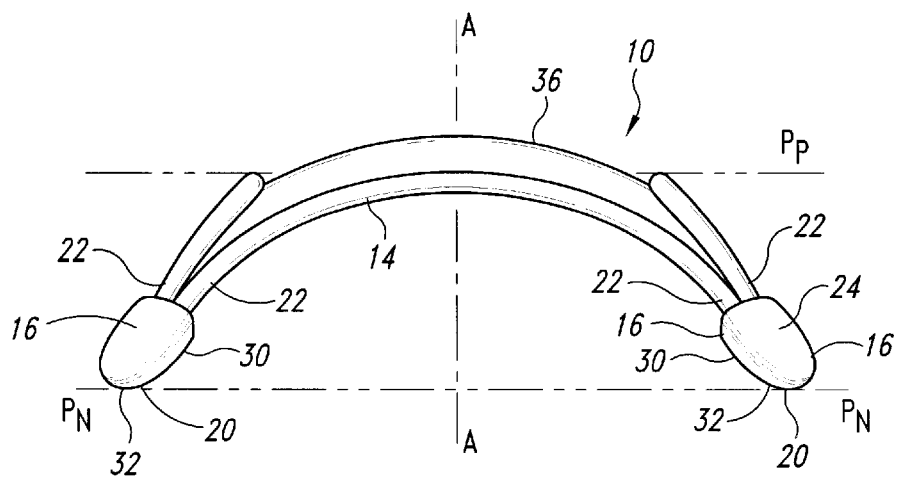
FIG. 4 is right side view thereof.
Figure 10:
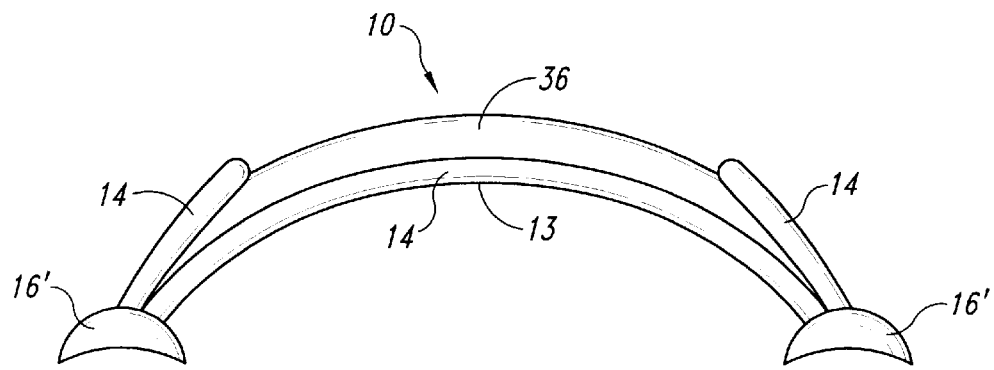
FIG. 10 is a view like FIG. 4 shown with an alternate embodiment of the feet members.
Figure 11:
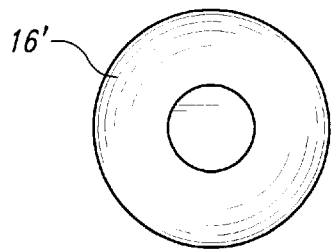
FIG. 11 is a bottom perspective view of an alternate foot member of FIG. 10.
Figure 12:
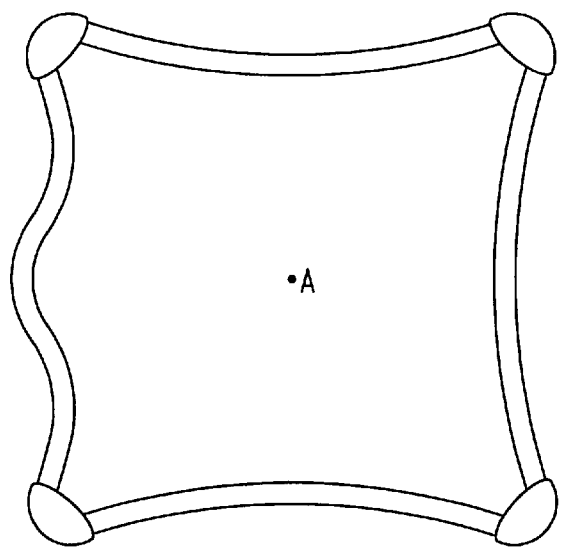
FIG. 12 is a top plan view of a second embodiment frame shape.
Figure 13:
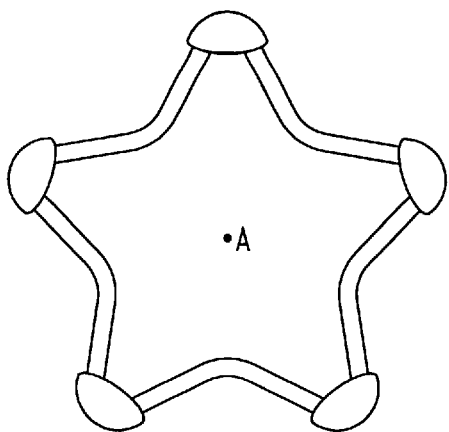
FIG. 13 is a top pan view of a third embodiment frame shape.
Figure 14:
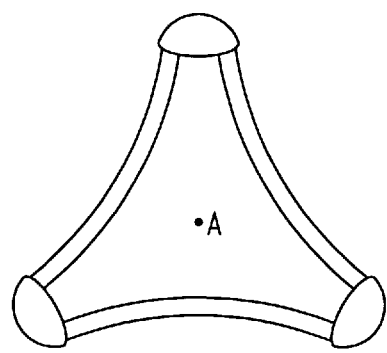
FIG. 14 is a top plan view of a fourth embodiment frame shape.
Figure 15:
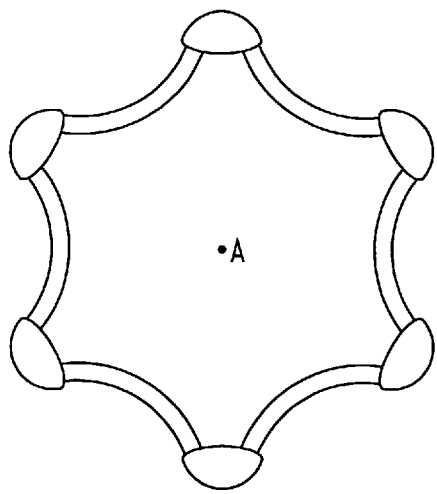
FIG. 15 is a top plan view of a fifth embodiment frame shape.

The foot member 16, as shown in FIGS. 4 and 6, may have a relatively gently sloping, curved outer surface 30. If the weighted rubber pad 22 is utilized, the sloped outward curved surface can easily be formed from the rubber material. The gentle slope of the foot member provides a sufficient planar area 32 to land after flight while still retaining the toy's upright, essentially concave shape. However, the invention is not limited to this particular foot member design. For example, FIGS. 10 and 11 discloses another embodiment where the bottom portion of each foot member 16' defines a substantially concave-shaped opening or indentation. The concave surface on the underside of each foot member assists in providing additional lift while the toy is in spinning flight.

Referring again to FIGS. 1–4, a flexible membrane 36 covers central opening 18. In one embodiment, this membrane may be a lightweight, but sturdy fabric, such as a woven nylon material. In the preferred embodiment, the flexible membrane is a urethane coated fabric for durability. However, any fabric, felt, lightweight foil, thermoplastic, urethane, rubber, latex, foam, or other flexible material, can be used. With the membrane, the overall shape of the toy is generally concave in nature. The highest point, or pinnacle, on the substantially concave-shaped toy is in a pinnacle plane $P_p$, which is substantially parallel to the nadir plane. The highest point on the toy is either the pinnacle of the concave point on the side members or, depending on the slackness of the membrane, a point on the membrane within the central opening. Referring only to FIG. 4, the toy 10 is shown where the bottom portions of the weighted feet are in the nadir plane $P_n$, the pinnacle of the concave portion of the side member shown is the highest point of the toy and is in the pinnacle plane $P_p$, and Axis A—A is substantially perpendicular to both planes.

The flying toy apparatus shape of the present invention is not dependent on the four side members as illustrated in FIGS. 1–4. Rather, any non-circular shape with arced sides members relative to the adjoining feet members may suffice. For purposes of illustrating examples of the many various frame types encompassed in the present invention, the reader is referred to top plan views showed in FIGS. 12–15.

Figure 16:
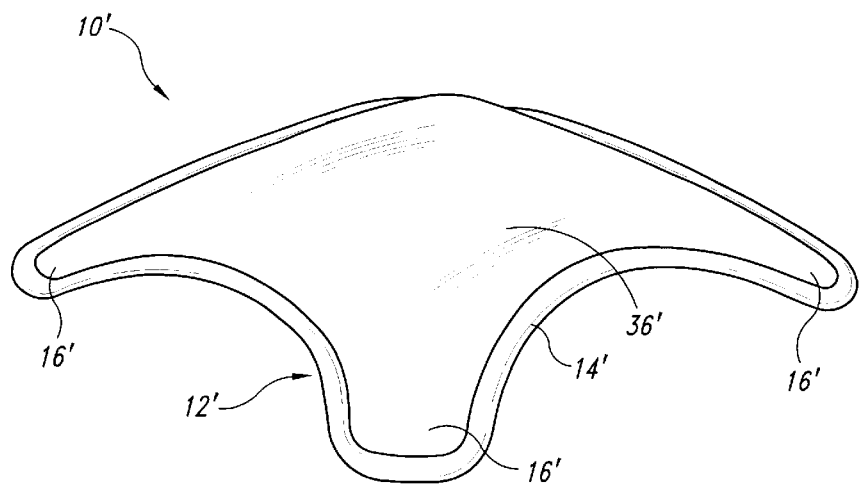
FIG. 16 is a perspective view of an alternate embodiment of the flying toy that is manufactured through a molding technique.
Figure 17:
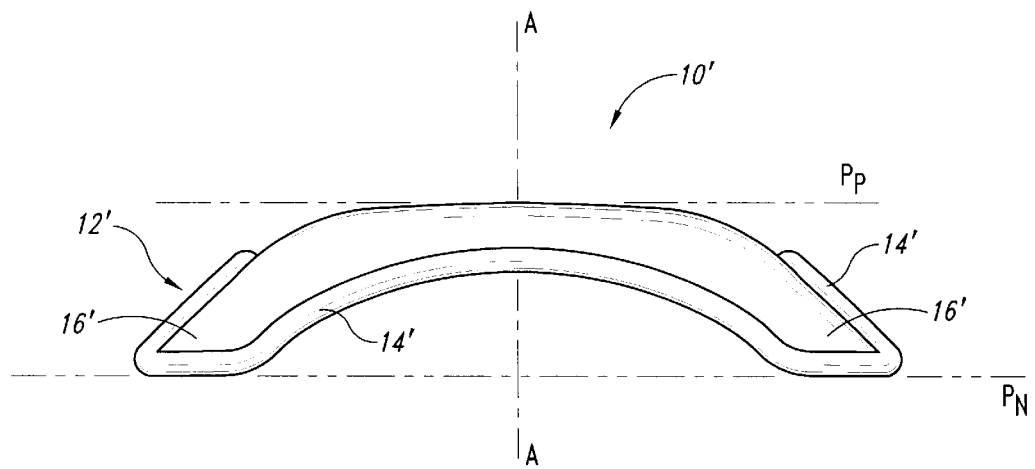
FIG. 17 is a side view of the alternate embodiment of FIG. 16.

According to yet another aspect of the present invention, an alternate embodiment of the toy 10' may be molded as a unitary structure. Referring to FIGS. 16 and 17, the frame 12', including side members 14' and feet members 16', and membrane 36' may all be molded as a unitary structure. Any common molding technique, such as blow molding, compression molding, injection molding, thermo-forming, or other techniques such as over-molding onto pre-molded components or fabrics, or combination thereof, may also be used. The molded flying toy of the present invention provides flexibility and resiliency, and, particularly, sufficient resilience in the side members to return the toy to its overall generally concave when the toy is at rest, and sufficient flexibility to allow centrifugal force induced by the weight of the spinning feet to partially flatten out the toy while in flight.

Figure 18:
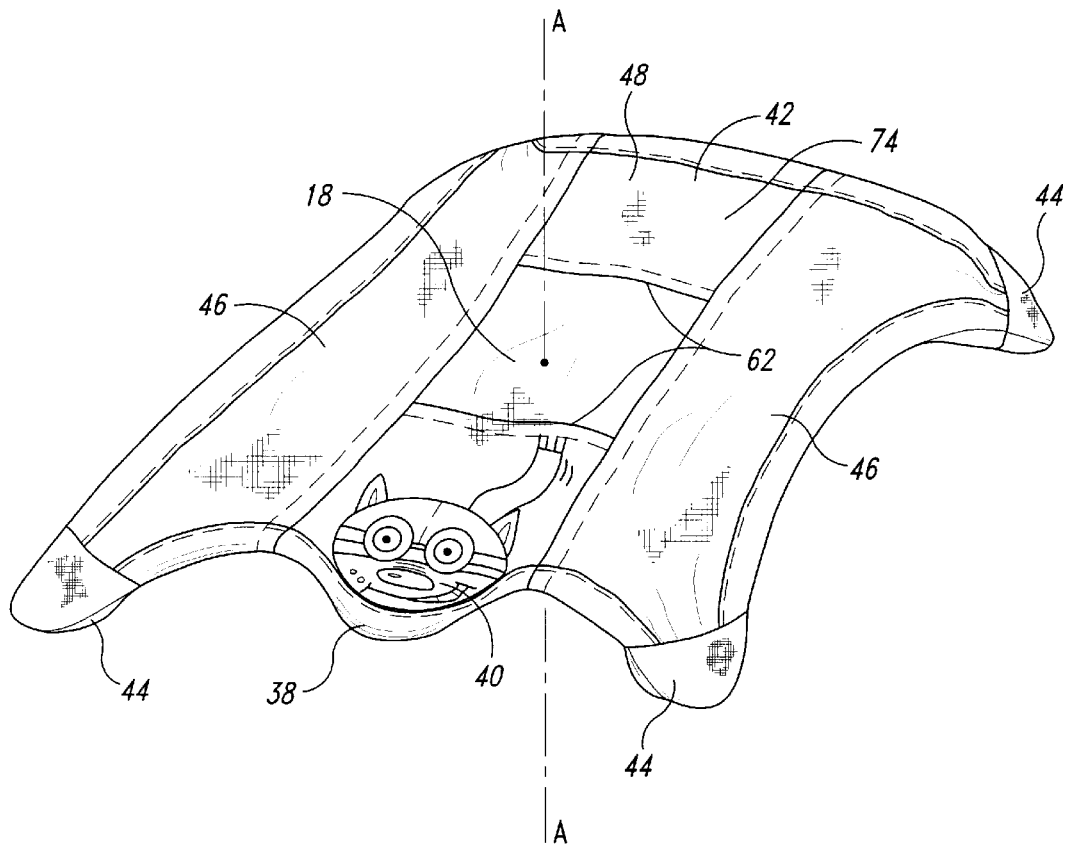
FIG. 18 is a perspective view of another alternate embodiment of the flying pet toy disclosing a frame that has an additional bowed out portion to accommodate a face for aesthetic purposes.

Referring to FIG. 18, the toy 10 may include a side member 38 bowed outwardly from Axis A—A on one side 38 to accommodate a face, or other design feature, for aesthetic purposes and/or product configuration purposes. For example, an anthropomorphic animal figure may be added to the membrane and frame for user interest, such as a squirrel (head shown at 40, body 42, and four legs 44 to replicate a "flying squirrel") and of which is the subject of the Applicant's U.S. Design Pat. No. D461,603, granted Aug. 13, 2002, and entitled "Flying Pet Toy" from an application filed Oct. 10, 2001.

Although not illustrated, the present invention can encompass variations in overall size. For example, the embodiment shown in FIG. 18 may be approximately 6–14 inches long taken as measured from one foot member to the adjacent foot member. However, the present invention encompasses a smaller version, such as one being less than 6 inches as measured from the standards discussed directly above. The smaller version would be ideally suited for office desk toy or promotional giveaway.

For visual interest to the user, the toy 10 may also include multicolor stripes, such as shown at 46 and 48 in FIG. 18, where "46" enumerates one color and "48" enumerates another contrasting color. In use, the colors of the membrane/frame spinning about Axis A—A can be visually interesting to the user, such as a child or pet, thus, encouraging further play.

Figure 19:
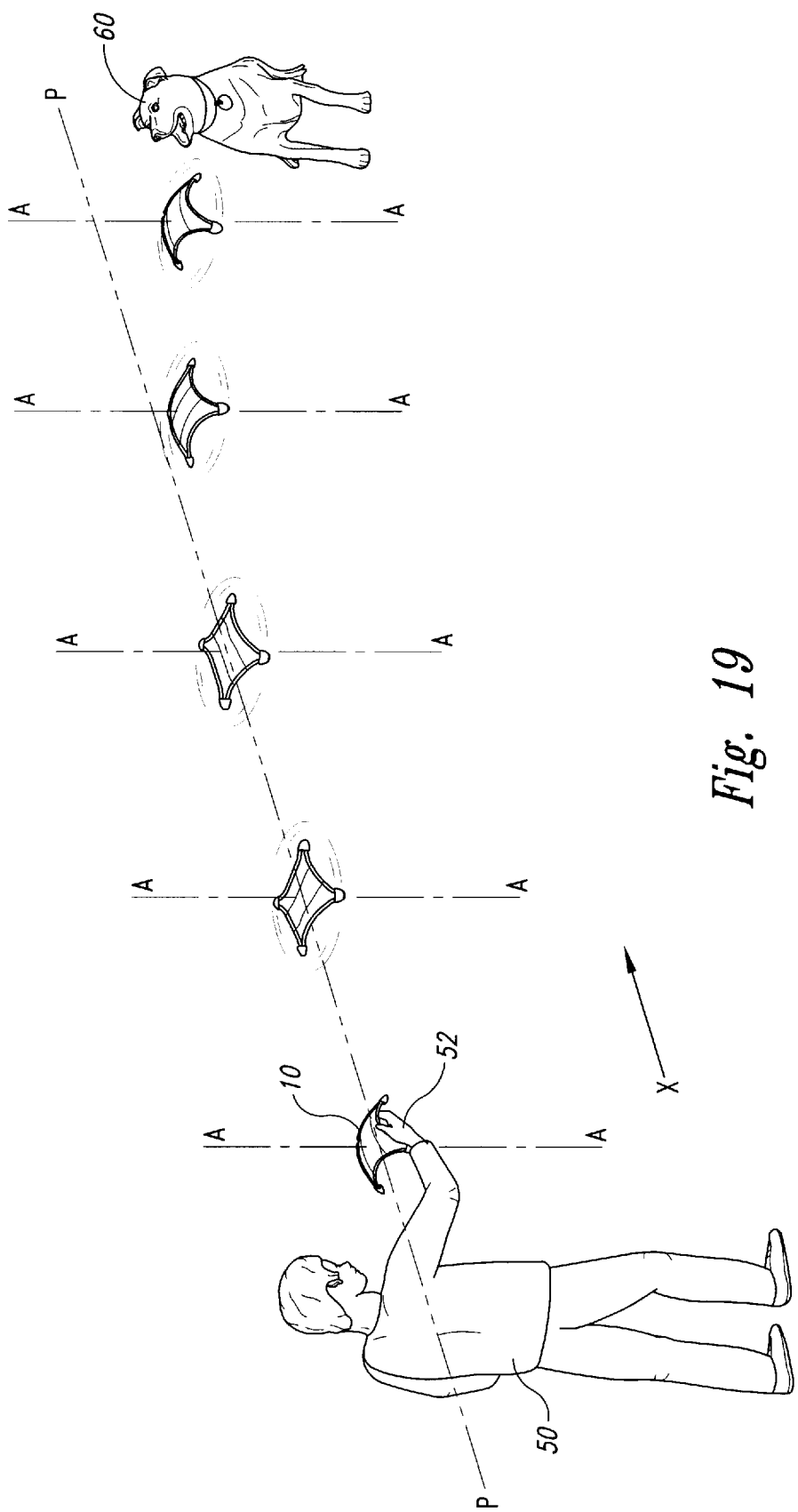
FIG. 19 is a perspective view showing the flying toy of FIG. 1 in use.
Figure 21:
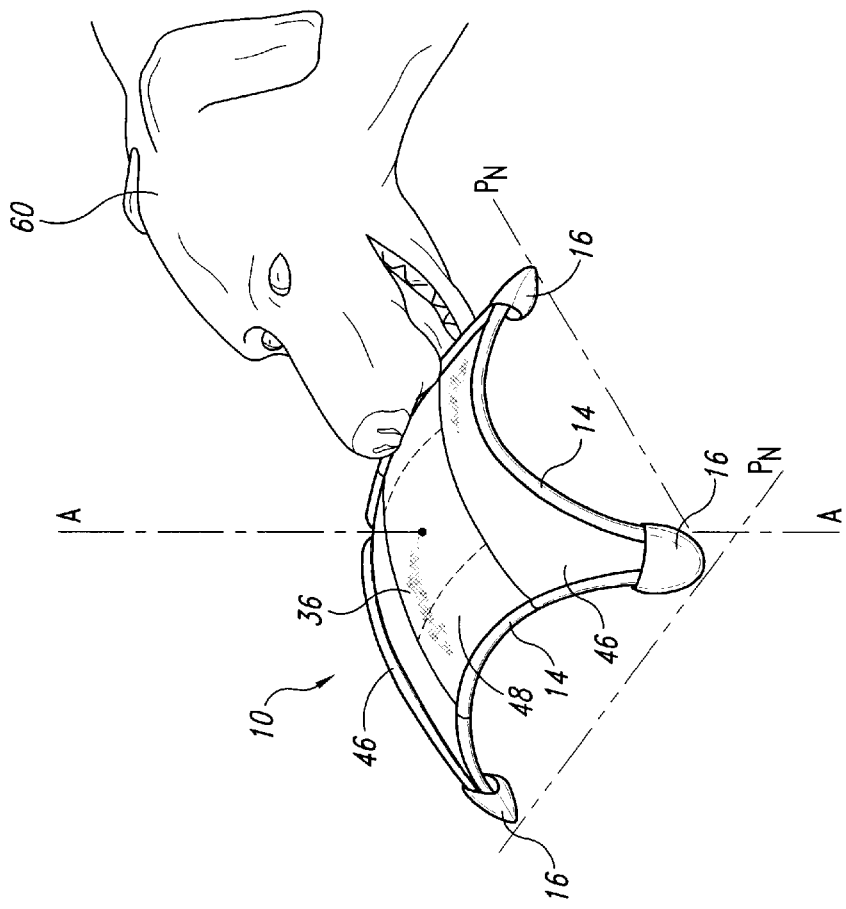
FIG. 21 is a perspective view when the flying toy of FIG. 20 has returned to its substantially concave shape in its "at rest" state.
Figure 20:
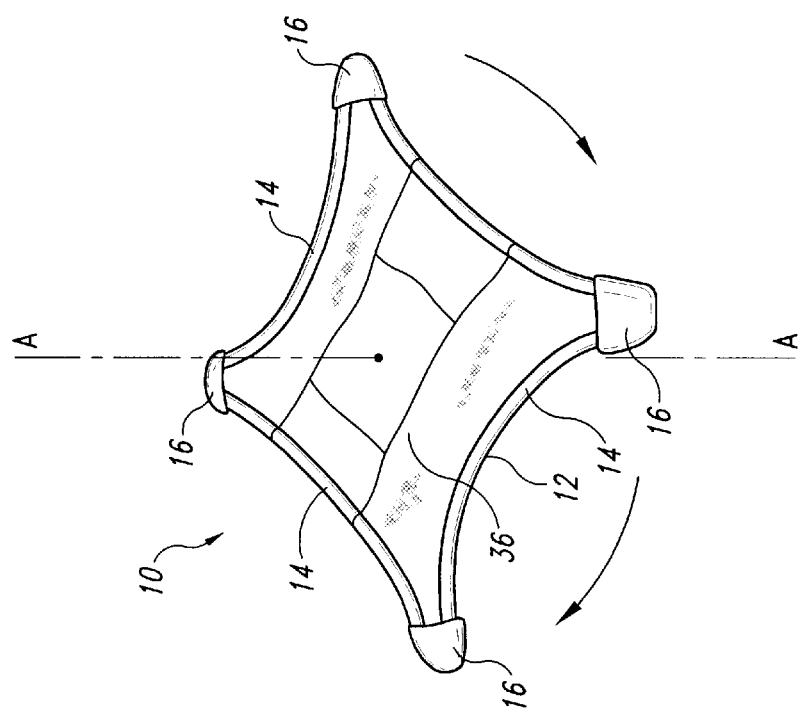
FIG. 20 is a perspective view of the flying toy of FIG. 1 flattening out in its "in use" state.

Use of the toy is best illustrated in FIGS. 19–21. A user 50 can grab a foot member or a side member (with or without a portion of the adjacent membrane). The toy is flung from the user's hand 52 in such a manner as to propel they toy with a spinning force in a relatively horizontally-oriented plane P. The feet members, side members, and membrane spin about Axis A—A, while the toy and Axis A—A move relative to the ground a distance X.

During flight (use state), centrifugal force imposed by the concentration of weight at the periphery makes the toy partially "flatten out" (FIG. 20) relative to the more defined concave shape when the toy is in the at rest state (FIG. 21). While the toy is relatively flattened out, it induces less drag (FIG. 20). The toy produces more lift as it regains a more concave shape as the spin slows down.

When momentum and spinning inertia cease, lift is no longer produced and the toy drops gently to the ground as it catches air in the concave-shaped membrane. The toy lands in an upright position and resumes its overall concave shape (FIG. 21). The raised side members 14 makes it easier for a dog 60 to grab.

Figure 23:
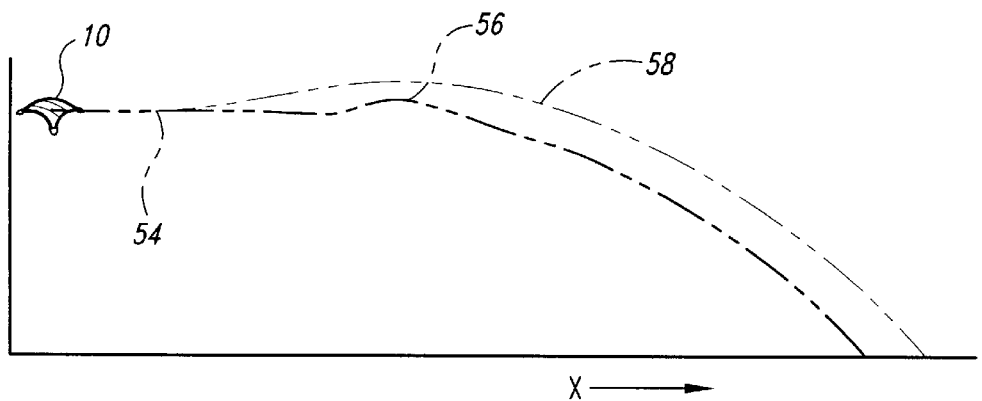
FIG. 23 is a schematic representation of a typical flight path of the toy of FIG. 1.

A schematic view of a typical flight path is shown in FIG. 23 at 54. The produced lift is shown at time point 56. A typical flight path 58 is illustrative of a light wind gust.

Figure 22:
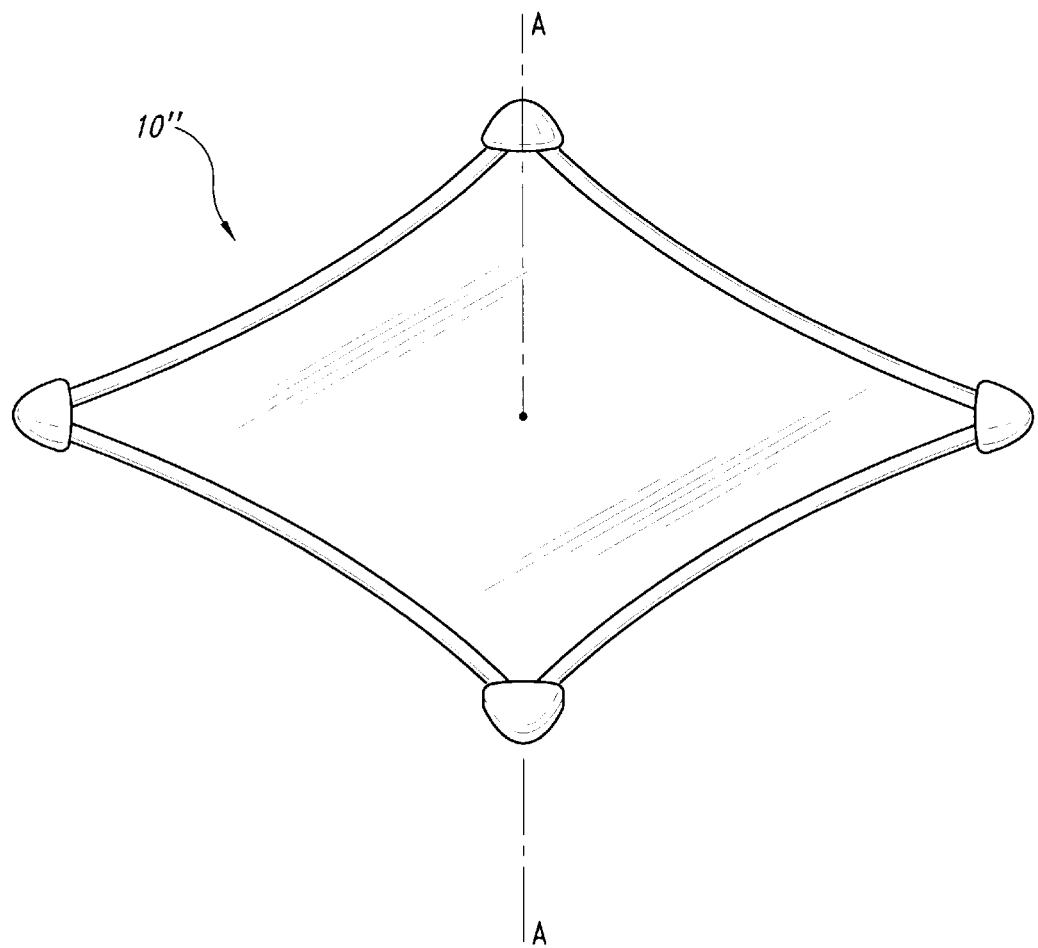
FIG. 22 is a perspective view of another alternate embodiment of the flying toy.
Figure 24:
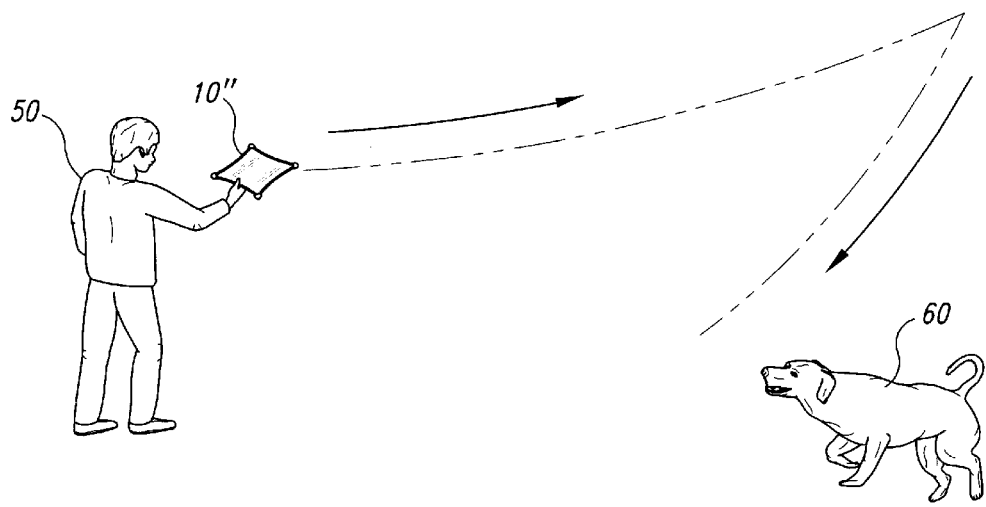
FIG. 24 is a schematic representation of the flight path when utilizing the invention of FIG. 22 as a boomerang.

An alternate embodiment of the toy 10" is illustrated in FIG. 22 where the side members 14" are not raised. The "flattened" embodiment of the toy is comparable to the view in FIG. 20, but the side members and feet members do not form a substantially concave overall shape as viewed from the side in an "at rest" state. Without the variable changing airfoil, which exists in the overall concave-shaped embodiment, the toy is prone to gyroscopic precession. This particular embodiment is well-suited for boomerang-like applications. FIG. 24 illustrates a schematic (plan) view of an alternate flight path when the toy of FIG. 22 is used as a boomerang.

As discussed above, the toy may be molded to achieve the shape and characteristics of the present invention. Other ways known to those of ordinary skill the art will be apparent as to how to produce the invention, such as through cut and sew techniques.

Also referring again to FIG. 18, the membrane 36 may be sewn in sections. This can be done not only to provide the aesthetic color stripes, discussed above, but also to add strength and flexibility to the membrane and to provide a substantially concave shape to the membrane. Moreover, the membrane may be made from one or more fabric layers. For example, an internal rectangular seamed box 62 defines the area where only a single layer of material covers central opening 18, rather than the double thickness layer elsewhere in the central opening area. In this embodiment, Axis A—A is positioned within the single fabric layer of box 62. The shape of the "box" is not important. The reduced weight of the membrane at the Axis, along with the higher concentration of the weight at the periphery, increases the spinning inertia about the Axis A—A during spinning flight, as well as maintaining gyroscopic stability.

Advantages of the present invention include a superior flying toy that easily spins about its axis, lands upright such that it is easy to grip (by a user's hand or a pet's teeth). The illustrated embodiments are only examples of the present invention and, therefore, are non-limitive. It is to be understood that many changes in the particular structure, materials, and features of the invention may be made without departing from the spirit and scope of the invention. Therefore, it is the Applicant's intention that his patent rights not be limited by the particular embodiments illustrated and described herein, but rather by the following claims interpreted according to accepted doctrines of claim interpretation, including the Doctrine of Equivalents and Reversal of Parts.

What is claimed is:

1. A flying toy comprising:
   a resilient, non-circular frame substantially radially generated about an imaginary center axis, said frame having a higher concentration of weight at its periphery, wherein the frame includes a plurality of elongated side members positioned between a plurality of corresponding radially-extending feet members, each said side member being positioned such that a central portion of each side member arcs inwardly toward the axis when the toy is in an at rest position;
   said frame defining a central opening of which the imaginary axis is axially aligned; and
   a lightweight, flexible membrane that attaches to at least a portion of the side members and substantially covers the central opening forming a structure that is capable of flight when propelled with a spinning force.

2. A flying toy comprising:
   a resilient, non-circular frame substantially radially generated about an imaginary center axis, said frame having a higher concentration of weight at its periphery, wherein the frame includes a plurality of elongated side members positioned between a plurality of corresponding radially-extending feet members, each said side member being positioned such that a central portion of each side member arches upwardly of the adjacent feet members and inwardly toward the axis when the toy is in an at rest position;

said frame defining a central opening of which the imaginary axis is axially aligned; and a lightweight, flexible membrane that attaches to at least a portion of the side members and substantially covers the central opening forming a substantially concave-shaped structure as viewed from the side when the structure is in the at rest state.

3. The toy according to claim 1 wherein the number of side members and the number of feet members is the same.

4. The toy according to claim 2 wherein the number of side members and the number of connected feet members is the same.

5. The toy according to claim 1 further comprising a weighted pad at each foot member.

6. The toy according to claim 2 further comprising a weighted pad at each foot member.

7. The toy according to claim 2 wherein there are four side members and four feet members, wherein each said foot member includes a weighted pad.

8. The toy according to claim 1 wherein each side member is a tube.

9. The toy according to claim 2 wherein each side member is a tube.

10. The toy according to claim 1 wherein each side member is a rod.

11. The toy according to claim 2 wherein each side member is a rod.

12. The toy according to claim 1 wherein each foot member includes an abrasion resistant bottom portion.

13. The toy according to claim 2 wherein each foot member includes an abrasion resistant bottom portion.

14. The toy according to claim 2 wherein each foot member includes a bottom portion having a substantially convex outer surface.

15. The toy according to claim 2 wherein each foot member includes a bottom portion defining a concave opening.

16. The toy according to claim 1 wherein the membrane is made of fabric.

17. The toy according to claim 2 wherein the membrane is made of fabric.

18. The toy according to claim 2 wherein the side members, feet members, and membrane are all molded into a unitary member.

* * * * *